United States Patent Office 3,729,471
Patented Apr. 24, 1973

3,729,471
TRIAZINE DERIVATIVES OF BISPHENOLS
Michael Robin, Colonia, and Sheldon R. Schulte, Highland Park, N.J., assignors to Ashland Oil, Inc., Houston, Tex.
No Drawing. Filed Dec. 16, 1969, Ser. No. 885,621
Int. Cl. C07d 55/50
U.S. Cl. 260—248 CS       12 Claims

ABSTRACT OF THE DISCLOSURE

Reaction products of a triazine compound such as a cyanuric halide and a hindered bisphenol are obtained. Such products are useful as antioxidants and ultraviolet stabilizers in various compositions and materials.

BACKGROUND OF THE INVENTION

This invention relates to novel substituted triazines, and a novel process of preparation. More particularly, it relates to reaction products of triazine compounds and hindered bisphenols and a process of preparation.

Synthetic polymers such as polyethylene, rubber (natural and synthetic), waxes, oils, fats and numerous other compounds are attacked by oxygen and eventually may become useless for their intended purpose. The chemical reaction by means of which oxygen attacks and degrades the compounds is a free radical chain reaction. Free radicals are produced by abstraction of hydrogen atoms from the molecules of the compounds by light, heat, mechanical action, active molecules, and the like.

The free radicals are extremely reactive in the presence of air and oxygen, forming peroxide radicals, which in turn abstract hydrogen atoms from the molecules to form additional radicals. These again react with oxygen in the same manner. Thus, once started, the reaction is a self-perpetuating, degradative, continuous chain reaction until stopped. In order to prevent such degradation, various antioxidants have been added to the polymers to react with and destroy the intermediate chemical free radicals as they form, without producing equally reactive intermediates.

Various phenols such as 2,2′-methylenebis-(6-tertiarybutyl - 4 - methylphenol) have been used as antioxidants; however, the prior antioxidants have the disadvantage of losing effectiveness at comparatively high temperatures, even when used in synergistic combinations. Continuing work is therefore being done to obtain compounds with improved antioxidant properties. We have found that the novel compounds of our invention surprisingly and unexpectedly exhibit increased stabilizing properties; and thereby the quantity necessary to achieve a desired level of stabilization at such temperatures as are normally used for molding, calendering, extrusion and other forming processes is reduced. Moreover, with the novel compounds of our invention, substantial degrees of stabilization can be attained at those higher temperatures at which combinations of triazine compounds and separate bisphenolic compounds are substantially less effective. The compounds of the invention, in addition to being excellent antioxidants, are also useful as ultraviolet light stabilizers.

BRIEF DESCRIPTION OF THE INVENTION

The novel compounds of the invention are substituted triazines in which at least one of the carbon atoms in the triazine ring is connected to a hindered phenol through the oxygen remaining after the removal of the hydrogen of a phenolic hydroxyl group.

The hindered phenol is a hindered bisphenol with the two phenolic rings bridged through a saturated aliphatic hydrocarbon linkage, and with at least one position ortho to the hydroxyl group on each ring being substituted with a bulky hydrocarbon group, other than the hydrocarbon linkage, of at least one carbon atom. Preferably all three of the carbon atoms in the triazine ring are connected to a hindered phenol through the oxygen remaining after the removal of the hydrogen of a phenolic hydroxyl group.

The novel compounds of our invention may constitute, for example, the reaction products of about one reacted mole of a triazine compound and at least about one reacted mole and preferably about three reacted moles of a hindered bisphenol. The hindered phenol is a hindered bisphenol with the two phenolic rings bridged through a saturated aliphatic hydrocarbon linkage, and with at least one position ortho to the hydroxyl group on each ring being substituted with a bulky hydrocarbon group, other than the hydrocarbon linkage, of at least one carbon atom.

The reaction products may be formed by employing known conditions of time, temperature, and environment for forming derivatives of triazines, but preferably are formed by our novel process which will be discussed hereinafter.

The compounds of the invention surprisingly and unexpectedly exhibit greatly superior antioxidant and ultraviolet light stabilization properties as compared to substituted triazines wherein the phenolic compound precursor contains only a single phenolic ring. Furthermore, compounds of the invention unexpectedly may stabilize as much as approximately ten times as effectively as the parent phenolic compounds from which they are obtained. Also compounds of the invention are at least about ten percent more effective as ultraviolet light stabilizers as compared to the parent phenolic compounds from which they are obtained.

When the novel compounds of the invention are obtained from fully hindered bisphenols, such are quite unexpected, since it has generally been believed by those of ordinary skill in the art that the hydroxyl groups of fully hindered phenols are virtually unreactive and cannot be converted to various derivatives by normal techniques. For example, the low reactivity of hindered phenols is discussed in Kirk and Othmer, Encyclopedia of Chemical Technology, vol. 1, pp. 902 and 906. Indeed, it is quite surprising and unexpected that when fully hindered phenols are used herein they will react with the triazine compounds under normal conditions for forming triazine derivatives. A "fully hindered bisphenol," for purposes of the present specification and claims, is one in which all positions ortho and para to the hydroxyl group on each ring of the bisphenol are substituted.

Briefly, the process aspect of the invention includes the reacting of the triazine compound and the hindered bisphenol in methyl ethyl ketone and/or diethyl ketone as a diluent.

DESCRIPTION OF THE PREFERRED EMBODIMENTS

The triazine compounds used in preparing the compounds of our invention can be any of the triazine compounds having reactive groups. Examples of such compounds are the halide substituted triazines. The preferred triazine compounds are the trihalide triazines, such as the chlorides, bromides, and iodides. Examples of some suitable halide triazines are 2,4,6 - trichloro - 1,3,5 - triazine (cyanuric chloride); 2,4,6-triiodo-1,3,5-triazine (cyanuric iodide); 2,4,6-tribromo-1,3,5-triazine (cyanuric bromide); 2,4,6-trifluoro-1,3,5-triazine (cyanuric fluoride); 2-chloro-4,6-dihydroxy-1,3,5-triazine; 2-chloro-4,6 - difluoro - 1,3,5-triazine; 2-fluoro-4,6-dichloro-1,3,5-triazine; and 2-chloro- 4,6-diiodo-1,3,5-triazine. The most preferred compound is 2,4,6-trichloro-1,3,5-triazine (cyanuric chloride).

The bisphenol compounds are represented by the following formula:

(I)
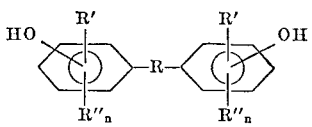

R is a saturated aliphatic hydrocarbon linkage or group (alkylidenes and alkylenes) having 1-8 carbon atoms, and preferably having 1-5 carbon atoms. More preferably R can be methylene, ethylene, isopropylene, ethylidene, n-propylidene, and isopropylidene. The most preferred R group is methylene.

The OH group on each ring can be in any position but preferably is either ortho or para to the hydrocarbon linkage and is most preferably in the ortho position.

Each R' individually is a bulky hydrocarbon group of at least one carbon atom and is ortho to the OH group on each ring. Usually the bulky hydrocarbon group is free of nonbenezenoid unsaturation. R' is preferably a bulky hydrocarbon group of from 1-22 carbon atoms such as methyl, ethyl, t-butyl, t-amyl, t-hexyl, cyclohexyl, t-pentyl, t-octyl, phenyl, naphthyl, α-methylcyclohexyl, nonyl, benzyl, menthyl, isobornyl, phenanthryl, anthranyl, norbornyl, cyclopropyl, cyclopentyl, bicyclohexyl, cyclobutyl, 1,2-dimethylcyclopropyl, and xylyl. More preferably R' is a bulky hydrocarbon of from 1-12 carbon atoms. It is especially preferred that the bulky hydrocarbon group is an alkyl group. This applies to the preferred carbon atom range of 1-22 as well as to the more preferred carbon atom range of 1-12. The most preferred bulky hydrocarbon group is t-butyl.

Each R" individually is any substituent which can be attached to the ring. R" advantageously is, but is not limited to: a hydrocarbon group such as the hydrocarbon groups set forth above for R'; or a halide group such as chlorine or bromine; or —NO$_2$; or —SR'''; or —OR'''; or —COOR'''; or —NR'''R'''; or —NHR$^{IV}$NH$_2$; or —NHOH: or —NHR$^{IV}$OH; wherein R''' is H or a hydrocarbon group as defined above for R', and R$^{IV}$ is an alkylene group of 1-22 carbon atoms and preferably of 1-12 carbon atoms. Some specific —SR''' groups are —SH; —SCH$_3$; —SC$_2$H$_5$; —SC$_9$H$_{19}$; —SC$_6$H$_5$; and —SC$_6$H$_{11}$. Some specific —OR''' groups are —OH; OC$_6$H$_5$; —OC$_6$H$_{11}$; —OCH$_3$; —OC$_2$H$_5$; and —OC$_9$H$_{19}$.

Some specific —COOR''' groups are —COOH;

—COOC$_2$H$_5$
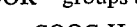
—COOC$_9$H$_{19}$; —COOC$_6$H$_5$; —COOC$_6$H$_{11}$; and —COOCH$_3$

Some specific —NR'''R''' groups are

—NH$_2$; NHCH$_3$; N(CH$_3$)$_2$;

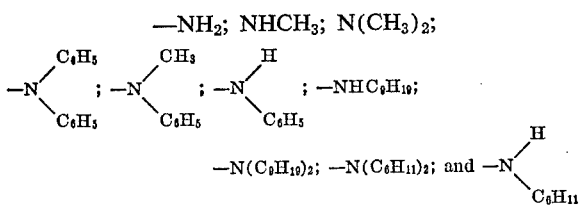

Some specific —NHR$^{IV}$NH$_2$ groups are —NHCH$_2$NH$_2$; —NHC$_2$H$_4$NH$_2$; —NHC$_2$H$_{16}$NH$_2$; and —NHC$_6$H$_{12}$NH$_2$.
Some specific —NHR$^{IV}$OH groups are —NHCH$_2$OH; —NHC$_2$H$_4$OH; —NHC$_9$H$_{18}$OH; and —NHC$_6$H$_{12}$OH.

R" preferably is an alkyl group containing at least one carbon atom with methyl being the most preferred. Usually alkyl groups of not more than 22 carbon atoms are employed. Advantageously, the alkyl group contains 1-12 carbon atoms.

n is a whole number integer from 0 to 3 and is preferably 1.

Specific examples of suitable bisphenols are 4, 4'-methylenebis-(2,6-dimethylphenol); 2,2' - methylenebis-(6-tert-butyl-4-methylphenol); 2,2'-methylenebis-(4-ethyl-6 - tert-butylphenol); 2,2'-methylenebis-(4-chloro - 6 - tert - butyl phenol); 4,4'-methylenebis-(2 - tert - butylphenol); 2,2'-methylenebis-(6-tert - butylphenol); 2,2' - methylenebis-(4,6 - di - tert - butylphenol); 2,2' - methylenebis-(4,6-dimethylphenol); 2,2' - isopropylidenebis - (4,6 - di-tert-butylphenol); 2,2'-methylenebis-(6-nonyl - 4 - methylphenol); and 2,2'-ethylidenebis-(4,6-di-tert-butylphenol). The preferred hindered bisphenol is 2,2'-methylenebis-(4-methyl-6-tert-butylphenol).

The diluent can be any liquid, provided it is inert (not reactive in any manner which will harm the reaction or the product) and will dissolve at least one of the reactants. Examples of suitable diluents are methylene chloride, dichloroethane, tetrachloroethane, trichloroethylene, dichlorobenzene, carbon disulfide, nitrobenzene and certain ketones such as acetone, methyl ethyl ketone, methyl isobutyl ketone, dibutyl ketone, and diethyl ketone.

Unexpectedly, we have found that an improved process is achieved when using methyl ethyl ketone and/or diethyl ketone as the diluent as compared with other similar diluents. It was surprisingly discovered that when using as reaction diluents, compounds other than methyl ethyl ketone and diethyl ketone it was necessary to employ at least one purification, such as recrystallization, in addition to the initial isolation step and washing, if any, to obtain a product of comparable purity. The separation of the desired product when the methyl ethyl ketone and/or diethyl ketone is the diluent can be readily accomplished by either mere filtration or by separating a ketone containing organic layer from an aqueous layer, and then evaporating the ketone. Of course, for extremely pure products it may be desirable to employ one or more washing steps. It can be readily be appreciated that such a reduction in process steps is a great advantage. The use of methyl ethyl ketone and/or diethyl ketone reduces the time and expense of obtaining the final desired product. The minimum amount of diluent is usually about 0.5 part by weight per part of reactants. The maximum amount of diluent is only limited by practical considerations such as economics and equipment capacities. Usually amounts of about 10 parts by weight per part of reactants are more than sufficient. Preferably the amount of diluent is between about 0.5 part and about 1.5 parts per part of reactants. The most preferred amount of diluent is about 1.0 part of diluent per part of reactants.

The process is not limited to specific reaction temperatures, since the reaction can be carried out over a wide range of temperatures. For example, the process can be carried out at temperatures of from about 0° C. to temperatures of about 250° C. The preferred temperature range varies from about 15° C. to about 100° C., and the most preferred temperature range is between about 15° C. and about 75° C. Also the process is not limited to any specific reaction time, since the time required will vary, primarily dependent upon the particular reactants, temperatures, and reaction environment. Preferably the reaction time varies from about 1 to about 6 hours. About 4 hours is the reaction time which is most commonly used.

Atmospheric pressure is the most commonly used pressure for carrying out the invention. Of course, higher or lower pressures can be employed when desired.

Usually the reaction is conducted under alkaline and in particular, caustic conditions. It is understood that it is not necessary to employ caustic conditions, particularly when temperatures at the upper end of the disclosed range are used.

Some of the novel triazine compounds of our invention are illustrated by the following structures:

(II)

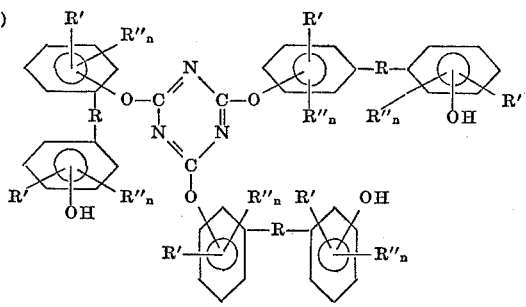

III

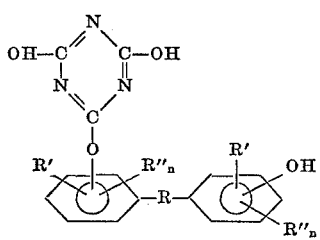

IV

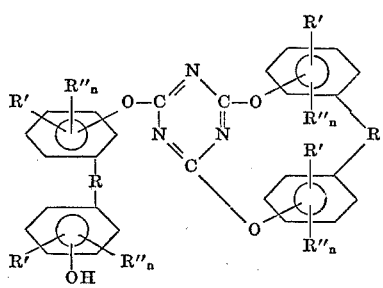

(V)

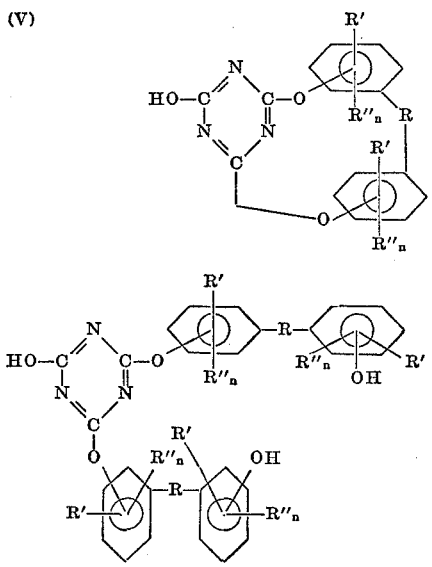

wherein R, R', R" and n have the same definitions and positions set forth in respect to Formula I.

The triazine derivatives of the invention are useful as antioxidants and ultraviolet stabilizers in a wide variety of materials. Among such materials are synthetic polymers, rubber (natural and synthetic), waxes, fats and oils. Among the synthetic polymers which can be stabilized with the products of this invention are: polyolefins, such as polyethylene, polypropylene and polybutene; diene rubbers, such as polyisoprene, polybutadiene, copolymers of conjugated dienes and at least one other copolymerizable monomer such as styrene, acrylonitrile, methyl acrylate, and 2-vinyl pyridine; polystyrene; polyacrylates; vinyl chloride polymers; polyesters; epoxies; polyurethanes and others. The products of this invention are particularly effective in stabilizing polyolefins, e.g. polypropylene and polyethylene. The amount of antioxidant needed to stabilize a particular amount of polymeric material can obviously be varied over a wide range of proportions dependent upon the identity of the specific polymeric material, the desired degree of stabilization, and the environment in which the material is to be used. An amount of about 0.1% by weight based upon the material to be stabilized is very effective. The threshold at which the compounds of the invention are effective is about 0.001% by weight based upon the weight of material to be stabilized. The compounds of the invention are used in amounts as high as 5% by weight or higher based upon the weight of material to be stabilized. The compounds of this invention have exhibited performance superior to the prior art antioxidants to which they have been compared, as will be illustrated in the following nonlimiting examples in which all parts are by weight unless the contrary is stated.

Example 1

To a mixture of one mole of cyanuric chloride (2,4,6-trichloro-1,3,5-triazine) dissolved in 2000 parts of acetone, at ambient temperature are added all at once and with agitation, 3 moles of 2,2'-methylenebis-(6-tert-butyl-4 methylphenol). While maintaining the temperature of the temperature of the mixture at about room temperature, three moles of NaOH as a 25% aqueous caustic soda solution are slowly added with agitation over approximately one hour. While stirring, the mixture is heated at 60° C. for 30 minutes, at which time 1000 parts of water are added. The mixture is heated while stirring at 70° C. for one hour, and then cooled to ambient temperature. The product is isolated from the reaction medium by filtration, washing with acetone and then with water, and then recrystallizing from benzene. The recrystallized product, 2,4,6-tris[2-(2-hydroxy-3-tert-butyl-5-methylbenzyl)-4-methyl-6-tert-butylphenyl] cyanurate, is a white solid melting at about 230° C. and has the following structure as determined by elemental analysis, nuclear magnetic resonance (NMR) and IR Spectra:

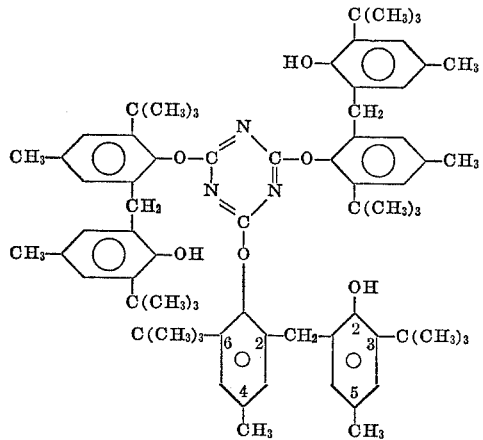

Example 2

To a mixture of one mole of cyanuric chloride (2,4,6-trichloro-1,3,5-triazine) dissolved in 2000 parts of methyl ethyl ketone at ambient temperature are added all at once and with agitation, 3 moles of 2,2'-methylenebis-(4,6-di-tert-butylphenol). While maintaining the temperature of the mixture at about room temperature, three moles of NaOH as a 25% aqueous caustic soda solution are slowly added with agitation over approximately one hour. While stirring, the mixture is heated at 60° C. for 30 minutes, at which time 1000 parts of water are added. The mixture is heated while stirring at 70° C. for one hour, and then cooled to ambient temperature. The reaction mass then forms two layers, the upper being a methyl ethyl ketone layer and the lower being an aqueous layer. The product is isolated from the reaction medium by separating the methyl ethyl ketone layer from the aqueous layer, washing with water and separating again, and evaporating off the liquids. The product, 2,4,6-tris-[2 - (2-hyroxy-3,5-di-tert-butylbenzyl)-4,6-di-tert - butylphenyl] cyanurate, is a white solid melting at about 104° C. and has the following structure as determined by elemental analysis and IR Spectra:

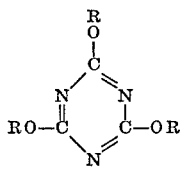

wherein each R is:

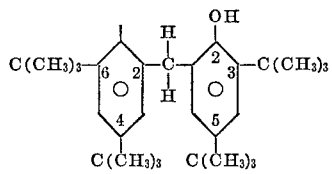

Example 3

To a mixture of one mole of cyanuric chloride (2,4,6-trichloro-1,3,5-triazine) dissolved in 2000 parts of methyl ethyl ketone, at ambient or room temperature are added all at once and with agitation, 3 moles of 2,2'-methylenebis-(6-nonyl-4-methylphenol). While maintaining the temperature of the mixture at about room temperature, three moles of NaOH as a 25% aqueous caustic soda solution are slowly added with agitation over approximately one hour. While stirring, the mixture is heated at 60° C. for 30 minutes, at which time 1000 parts of water are added. The mixture is heated while stirring at 70° C. for one hour, and then cooled to ambient temperature. The reaction then forms two layers, the upper being a methyl ethyl ketone layer and the lower being an aqueous layer. The product is isolated from the reaction medium by separating the methyl ethyl ketone layer from the aqueous layer, washing with water, separating again and evaporating off the liquids. The product, 2,4,6-tris[2-(2-hydroxy-3-nonyl-5-methylbenzyl)-4-methyl - 6 - nonylphenyl]cyanurate, is a white solid melting at about 65° C. and has the following structure as determined by elemental analysis, and IR Spectra:

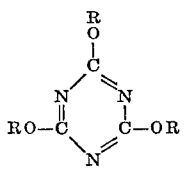

wherein each R is:

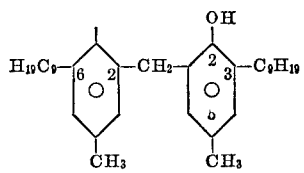

Example 4

To a mixture of one mole of cyanuric chloride (2,4,6-trichloro-1,3,5-triazine) dissolved in 2000 parts of methyl ethyl ketone, at ambient or room temperature are added all at once and with agitation, 3 moles of 2,2'-ethylidenebis(4,6-di-tert-butylphenol). While maintaining the temperature of the mixture at about room temperature, three moles of NaOH as a 25% aqueous caustic soda solution are slowly added with agitation over approximately one hour. While stirring, the mixture is heated at 60° C. for 30 minutes, at which time 1000 parts of water are added. The mixture is heated while stirring at 70° C. for one hour, and then cooled to ambient temperature. The product is isolated from the reaction medium by filtration, and washing with methyl ethyl ketone and then with water. The product, 2,4,6-tris[2-(2-hydroxy-3,5-di-tert - butylmethylbenzyl)-4,6-di-tert-butylphenyl] cyanurate is a white solid melting at about 232° C. and has the following structure as determined by elemental analysis and IR Spectra:

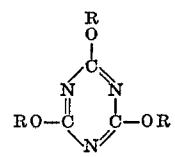

wherein each R is:

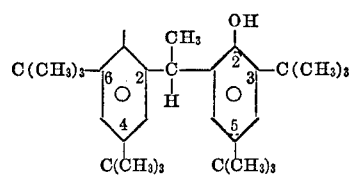

Example 5

To a mixture of one mole of cyanuric chloride (2,4,6-trichloro-1,3,5-triazine) dissolved in 2000 parts of methyl ethyl ketone, at ambient or room temperature are added all at once and with agitation, 3 moles of 2,2'-methylenebis-(6-tert-butyl-4-chlorophenol). While maintaining the temperature of the mixture at about room temperature, 3 moles of NaOH as a 25% aqueous caustic soda solution are slowly added with agitation over approximately one hour. While stirring, the mixture is heated at 60° C. for 30 minutes, at which time 1000 parts of water are added. The mixture is heated while stirring at 70° C. for one hour, and then cooled to ambient temperature. The reaction then forms two layers, the upper being a methyl ethyl ketone layer and the lower being an aqueous layer. The product is isolated from the reaction medium by separating the methyl ethyl ketone layer from the aqueous layer, washing with water, separating again and evaporating off the liquids. The product, 2,4,6-tris[2-(2-hydroxy-3-tert-butyl-5-chlorobenzyl)-4-chloro-6-tert-butylphenol] cyanurate, is a white solid melting at about 114° C. and has the following structure as determined by elemental analysis and IR Spectra:

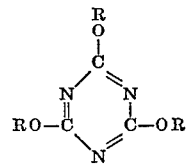

wherein each R is:

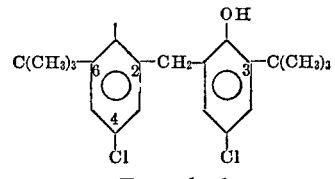

Example 6

To a mixture of one mole of cyanuric chloride (2,4,6-trichloro-1,3,5-triazine) dissolved in 2000 parts of methyl ethyl ketone, at ambient or room temperature are added all at once and with agitation, 3 moles of 2,2'-methylenebis-(4,6-dimethylphenol). While maintaining the temperature of the mixture at about room temperature, 3 moles of NaOH as a 25% aqueous caustic soda solution are slowly added with agitation over approximately one hour. While stirring, the mixture is heated at 60° C. for 30 minutes, at which time 1000 parts of water are added. The mixture is heated while stirring at 70° C. for one hour, and then cooled to ambient temperature. The reaction mass then forms two layers, the upper being a methyl ethyl ketone layer and the lower being an aqueous layer. The product is isolated from the reaction medium by separating the methyl ethyl ketone layer from the aqueous layer, washing with water, separating again and evaporating off the liquids. The product, 2,4,6-tris[2-(2-hydroxy - 3,5 - di - methylbenzyl) - 4,6 - di - methylphenyl] cyanurate, is a white solid melting at about 115° C. and has the following structure as determined by elemental analysis and IR Spectra:

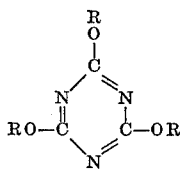

wherein each R is:

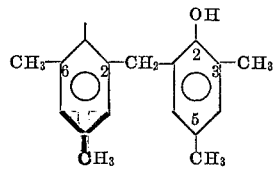

The following Examples 7–15 are presented to demonstrate the improved process when employing methyl ethyl ketone and/or diethyl ketone as the diluent:

Example 7

To a mixture of 0.1 mole of cyanuric chloride (2,4,6-trichloro-1,3,5 - triazine) dissolved in 250 parts by volume of acetone, at ambient temperature are added all at once and with agitation, 0.3 mole of 2,2'-methylenebis-(6-tert-butyl-4-methylphenol). While maintaining the temperature of the mixture at about room temperature, 0.3 mole of NaOH as a 3% aqueous caustic soda solution are slowly added with agitation over approximately one hour. While stirring, the mixture is heated at 60° C. for 30 minutes, at which time 100 parts of water are added. The mixture is heated while stirring at 70° C. for one hour, and then cooled to ambient temperature. A purple crude reaction product melting at about 212° C. is isolated from the reaction medium by simple filtration followed by washing with acetone and then with water.

Example 8

To a mixture of 0.1 mole of cyanuric chloride (2,4,6-trichloro-1,3,5-triazine) dissolved in 175 parts by volume of methylisobutyl ketone, at ambient temperature are added all at once and with agitation, 0.3 mole of 2,2'-methylenebis-(6-tert-butyl-4-methylphenol). While maintaining the temperature of the mixture at about room temperature, 0.3 mole of NaOH as a 25.6% aqueous caustic soda solution are slowly added with agitation over approximately one hour. While stirring, the mixture is heated at 60° C. for 30 minutes, at which time 100 parts of water are added. The mixture is heated while stirring at 70° C. for one hour, and then cooled to ambient temperature. Only a gummy solid product is isolated from the reaction medium by simple filtration followed by washing with methylisobutyl ketone and then with water.

Example 9

To a mixture of 0.1 mole of cyanuric chloride (2,4,6-trichloro-1,3,5-triazine), dissolved in 150 parts by volume of dimethylformamide, at ambient temperature are added all at once and with agitation, 0.3 mole of 2,2'-methylenebis-(6-tert-butyl-4-methylphenol). While maintaining the temperature of the mixture at about room temperature, 0.3 mole of NaOH as a 24.4% aqueous caustic soda solution are slowly added with agitation over approximately one hour. While stirring, the mixture is heated at 60° C. for 30 minutes, at which time 100 parts of water are added. The mixture is heated while stirring at 70° C. for one hour, and then cooled to ambient temperature. Only a gummy solid product is isolated from the reaction medium by simple filtration, followed by washing with dimethylformamide and with water.

Example 10

To a mixture of 0.1 mole of cyanuric chloride (2,4,6-trichloro-1,3,5-triazine), dissolved in 150 parts by volume of cyclohexanone, at ambient temperature are added all at once and with agitation, 0.3 mole of 2,2'-methylenebis-(6-tert-butyl-4-methylphenol). While maintaining the temperature of the mixture at about room temperature, 0.3 mole of NaOH as a 24.4% aqueous caustic soda solution are slowly added with agitation over approximately one hour. While stirring, the mixture is heated at 60° C. for 30 miuntes, at which time 100 parts of water are added. The mixture is heated while stirring at 70° C. for one hour, and then cooled to ambient temperature. A low melting mixture is isolated from the reaction medium by concentration, followed by filtration, washing with cyclohexanone and then with water.

Example 11

To a mixture of 0.1 mole of cyanuric chloride (2,4,6-trichloro-1,3,5-triazine) dissolved in 250 parts by volume of methyl ethyl ketone, at ambient temperature are added all at once and with agitation, 0.3 mole of 2,2'-methylenebis-(6-tert-butyl-4-methylphenol). While maintaining the temperature of the mixture at about room temperature, 0.3 mole of NaOH as a 10% aqueous caustic soda solution are slowly added with agitation over approximately one hour. While stirring, the mixture is heated at 60° C. for 30 minutes, at which time 100 parts of water are added. The mixture is heated while stirring at 70° C. for one hour, and then cooled to ambient temperature. The product is isolated from the reaction medium by simple filtration, followed by washing with methyl ethyl ketone and then with water. The reaction product, 2,4,6-tris[2-(2-hydroxy - 3 - tert - butyl - 5 - methylbenzyl) - 4 - methyl-6-tert-butylphenyl] cyanurate, is a while solid melting at about 246–250° C. and has the following structure as determined by elemental analysis, nuclear magnetic resonance (NMR) and IR Spectra:

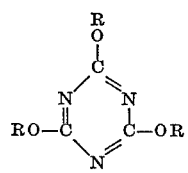

wherein each R is

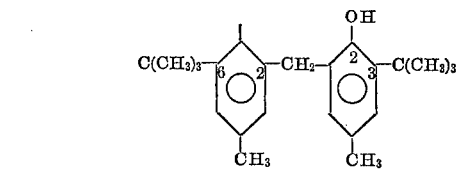

Example 12

To a mixture of 0.2 mole of cyanuric chloride (2,4,6-trichloro-1,3,5-triazine) dissolved in 175 parts by volume of methyl ethyl ketone, at ambient temperature are added all at once and with agitation, 0.5 mole of 2,2'-methylenebis-(6-tert-butyl-4-methylphenol). While maintaining the temperature of the mixture at about room temperature, 0.6 mole of NaOH as a 25% aqueous caustic soda solution are slowly added with agitation over approximately one hour. While stirring, the mixture is heated at 60° C. for 30 minutes, at which time 100 parts of water are added. The mixture is heated while stirring at 70° C. for one hour, and then cooled to ambient temperature. The product is isolated from the reaction medium by simple filtration followed by washing with methyl ethyl ketone and then with water. The product is a white solid melting at about 248–250° C. and has the same structure as set forth in Example 11 as determined by elemental analysis and IR Spectra.

Example 13

To a mixture of 0.1 mole of cyanuric chloride (2,4,6-trichloro-1,3,5-triazine) dissolved in 150 parts by volume of diethyl ketone, at ambient temperature are added all at once and with agitation, 4.8 moles of 2,2'-methylenebis-(6-tert-butyl-4-methylphenol). While maintaining the temperature of the mixture at about room temperature, 0.3 mole of NaOH as a 25.0% aqueous caustic soda solution are slowly added with agitation over approximately ½ hour. While stirring, the mixture is heated at 60° C. for 30 minutes, at which time 100 parts of water are added. The mixture is heated while stirring at 70° C. for one hour, and then cooled to ambient temperature. The product is isolated from the reaction medium by filtration, followed by washing with diethyl ketone and then with water.

The product is a white solid melting at about 248–252° C. and has the same structure as set forth in Example 11 as determined by elemental analysis and IR Spectrum.

Example 14

To a mixture of 0.1 mole of cyanuric chloride (2,4,6-trichloro-1,3,5-triazine) dissolved in 100 parts by volume of methyl ethyl ketone, at ambient temperature are added all at once and with agitation, 0.3 mole of 2,2'-methylenebis-(6-tert-butyl-4-methylphenol). While maintaining the temperature of the mixture at about room temperature, 0.3 moles of NaOH as a 24.4% aqueous caustic soda solution are slowly added with agitation over approximately one hour. While stirring, the mixture is heated at 60° C. for 30 minutes, at which time 100 parts of water are added. The mixture is heated while stirring at 70° C. for one hour, and then cooled to ambient temperature. The product is isolated from the reaction medium by filtration, followed by washing with methyl ethyl ketone and then with water. The product is a white solid melting at about 248–253° C. and has the same structure as set forth in Example 11 as determined by elemental analysis and IR Spectrum.

Example 15

To a mixture of 0.1 mole of cyanuric chloride (2,4,6-trichloro-1,3,5-triazine) dissolved in 51 parts by volume of methyl ethyl ketone at ambient temperature are added all at once and with agitation, 0.3 mole of 2,2'-methylenebis-(6-tert-butyl-4-methylphenol). While maintaining the temperature of the mixture at about room temperature, 0.3 mole of NaOH as a 24.4% aqueous caustic soda solution are slowly added with agitation over approximately one hour. While stirring, the mixture is heated at 60° C. for 30 minutes, at which time 100 parts of water are aded. The mixture is heated while stirring at 70° C. one hour, and then cooled to ambient temperature. The product is isolated from the reaction medium by filtration, followed by washing with methyl ethyl ketone and then with water. The product is a white solid melting at about 245–251.5° C. and has the same structure as set forth in Example 11 as determined by elemental analysis and IR Spectrum.

It is readily apparent from the preceding examples that the use of methyl ethyl ketone and/or diethyl ketone as the diluent truly gives an improved process which is quite unexpected.

Example A

The product of Example 1 is admixed with a polyethylene of 0.96 density and 300,000 molecular weight in a steel container and the mixture is extruded twice at 300° F. The concentration of the product of Example 1 is then adjusted to 0.1% by weight of the polymer by the addition of more of the polyethylene and the mixture is again extruded twice at 300° F. The resulting polyethylene composition is then pressed into a 6–6.5 mil film at 310° F. and 1280 p.s.i. on a 10" hydraulic ram press. Likewise, a film of the same polyethylene without antioxidant and films of the same polyethylene containing 0.1% of some other antioxidants are prepared by the method set forth above. The resulting films are then subjected to 125°±1° C. in a forced draft oven. The absorbance in the carbonyl region of the IR Spectrum (5.8 microns) is then recorded after periods of exposure. When absorbance reaches 94%, the sample is considered to be "oxidized" and the time of exposure to reach this point is recorded in the table below:

| Additive | Amount, percent | Time in hours to reach 94% absorbance |
| --- | --- | --- |
| None | | 50 |
| 2,2'-methylenebis-(6-tert-butyl-4-methyphenol) | 0.1 | 130 |
| Product of Example 1 | 0.1 | 1,012 |
| Product of Example 5 | 0.1 | 531 |
| 2,2'-methylenebis-(6-tert-butyl-4-chlorophenol) | 0.1 | 130 |

Example B

The product of Example 1 is admixed with a polypropylene of 0.90 density and approximately 325,000 molecular weight in a steel container and the mixture is extruded twice at 380° F. The resulting polypropylene compositions containing 0.5% by weight of the product of Example 1 are then pressed into a 6–6.5 mil film at 350° F. and 1280 p.s.i. on a 10" hydraulic ram press. Likewise, a film of the same polypropylene without any antioxidant and a film of the same polypropylene containing 0.5% of 2,2'-methylenebis-(6-tert-butyl-4-methylphenol) are prepared by the method set forth above. The resulting three films are then subjected to 150°±1° C. in a forced draft oven. The absorbance in the carbonyl region of the IR Spectrum (5.8 microns) is then recorded after periods of exposure. When absorbance reaches 94% the sample is considered to be "oxidized," and the time of exposure to reach this point is recorded.

| Additive | Amount, percent | Time in hours to reach 94% absorbance |
| --- | --- | --- |
| None | | 2 |
| 2,2'-methylenebis-(6-tert-butyl-4-methylphenol) | 0.5 | 20 |
| Product of Example 1 | 0.5 | 140 |

What is claimed is:

1. The substituted triazine which is 2,4,6-tris-[2-(2-hydroxy-3-tert-butyl-5-methylbenzyl)-4-methyl - 6 - tert-butylphenyl] cyanurate.

2. The bisphenol substituted triazine according to claim 7 which is 2,4,6-tris[2-(2-hydroxy-3,5-di-tert-butyl benzyl)-4,6-di-tert-butylphenyl] cyanurate.

3. The substituted triazine which is 2,4,6-tris-[2-(2-hydroxy-3-nonyl-5-methylbenzyl) - 4 - methyl-6-nonylphenyl] cyanurate.

4. The substituted triazine which is 2,4,6-tris-[2-(2-hydroxy-3,5-di-tert-butylmethylbenzyl)-4,6-di-tert - butylphenyl] cyanurate.

5. The substituted triazine which is 2,4,6-tris-[2,(2-hydroxy-2-tert-butyl-5-chlorobenzyl) - 4 - chloro - 6 - tert-butylphenyl] cyanurate.

6. The substituted triazine which is 2,4,6-tris-[2-(2-hydroxy - 3,5 - di - methylbenzyl)-4,6-di-methylphenyl] cyanurate.

7. A bisphenol substituted triazine of the formula:

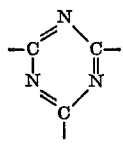

wherein the unsatisfied valences on the foregoing triazine nucleus are satisfied by a hydroxyl group or a hindered bisphenol moiety of the character:

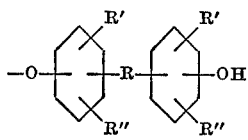

wherein each R is a saturated aliphatic hydrocarbon linkage independently selected from alkylidenes and alkylenes of 1–8 carbon atoms, wherein each R' is independently selected from alkyl of 1–12 carbon atoms and which is ortho to the OH group on each ring, wherein each R" is independently selected from alkyls of 1–12 carbon atoms which is ortho or para to the OH group on each ring, with the proviso that at least one of the three valences on said triazine nucleus must be satisfied by a hindered bisphenol substituent.

8. A substituted triazine according to claim 7 wherein R is methylene.

9. A substituted triazine according to claim 8 wherein all three of the valences on said triazine nucleus are satisfied by a hindered bisphenol moiety.

10. A substituted triazine according to claim 9 wherein the OH group on each ring is ortho to the hydrocarbon linkage represented by R.

11. A substituted triazine according to claim 10 wherein R" is in the para position to the OH on each ring.

12. A substituted triazine according to claim 11 wherein R' is t-butyl.

References Cited

UNITED STATES PATENTS

| | | | |
|---|---|---|---|
| 3,250,772 | 5/1966 | Dexter et al. | 260—248 |
| 3,316,263 | 4/1967 | Ross et al. | 260—248 |
| 3,454,551 | 7/1969 | Mangini et al. | 260—248 X |

JOHN M. FORD, Primary Examiner

U.S. Cl. X.R.

252—403, 300; 260—45.8 N

UNITED STATES PATENT OFFICE
CERTIFICATE OF CORRECTION

Patent No. 3,729,471       Dated April 24, 1973

Inventor(s) Sheldon R. Schulte and Michael Robin

It is certified that error appears in the above-identified patent and that said Letters Patent are hereby corrected as shown below:

In Column 3, line 71; "$NHC_2H_{16}NH_2$" should be corrected to --$NHC_9H_{18}NH_2$--.

In column 6, line 30; "the temperature of" should be cancelled.

In Column 8, lines 60-65; "  " should be corrected to 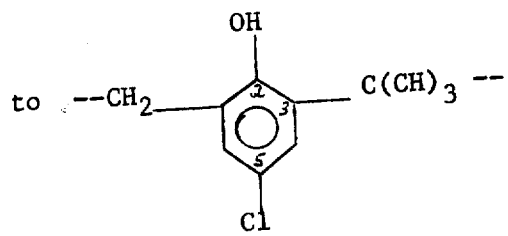 --

In Column 12, line 71; "hydroxy-2-tert" should be corrected to --hydroxy-3-tert--.

Signed and sealed this 1st day of October 1974.

(SEAL)
Attest:

McCOY M. GIBSON JR.
Attesting Officer

C. MARSHALL DANN
Commissioner of Patents